US011894191B2

(12) United States Patent
Kim et al.

(10) Patent No.: US 11,894,191 B2
(45) Date of Patent: Feb. 6, 2024

(54) MULTILAYER ELECTRONIC COMPONENT

(71) Applicant: SAMSUNG ELECTRO-MECHANICS CO., LTD., Suwon-si (KR)

(72) Inventors: Jae Hoon Kim, Suwon-si (KR); Ji Hoon Kim, Suwon-si (KR); Gyoung Heon Ko, Suwon-si (KR); Yong Hoon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 78 days.

(21) Appl. No.: 17/721,808

(22) Filed: Apr. 15, 2022

(65) Prior Publication Data
US 2023/0207197 A1    Jun. 29, 2023

(30) Foreign Application Priority Data

Dec. 24, 2021 (KR) ................. 10-2021-0187671

(51) Int. Cl.
*H01G 4/012* (2006.01)
*H01G 4/12* (2006.01)
*H01G 4/232* (2006.01)
*H01G 4/30* (2006.01)

(52) U.S. Cl.
CPC ........... *H01G 4/012* (2013.01); *H01G 4/1227* (2013.01); *H01G 4/232* (2013.01); *H01G 4/30* (2013.01)

(58) Field of Classification Search
CPC ...... H01G 4/012; H01G 4/1227; H01G 4/232; H01G 4/30; H01G 4/32
See application file for complete search history.

(56) References Cited

U.S. PATENT DOCUMENTS

| 2008/0055019 | A1* | 3/2008 | Togashi | H03H 7/06 333/185 |
| 2015/0213956 | A1* | 7/2015 | Choi | H01G 4/30 361/301.4 |
| 2016/0240314 | A1 | 8/2016 | Fujii | |
| 2017/0148571 | A1* | 5/2017 | Akada | H01G 4/232 |

(Continued)

FOREIGN PATENT DOCUMENTS

| JP | 2016-149479 A | 8/2016 |
| KR | 10-2019-0053692 A | 5/2019 |

*Primary Examiner* — Michael P McFadden
(74) *Attorney, Agent, or Firm* — Morgan, Lewis & Bockius LLP

(57) ABSTRACT

A multilayer electronic component may include a first internal electrode layer including a first dielectric layer and first to fourth internal electrodes disposed to be spaced apart from each other on the first dielectric layer, a second internal electrode layer including a second dielectric layer and a fifth internal electrode disposed on the second dielectric layer, a body including a capacitance forming portion in which the first internal electrode layer and the second internal electrode layer are alternately disposed, a connection electrode penetrating through the first and second internal electrode layers, spaced apart from the first to fourth internal electrodes, and connected to the fifth internal electrode, first to fourth external electrodes disposed to be connected to the first to fourth internal electrodes, respectively, on the body, and a fifth external electrode disposed to be connected to the connection electrode on the body.

20 Claims, 9 Drawing Sheets

(56) References Cited

U.S. PATENT DOCUMENTS

| | | | |
|---|---|---|---|
| 2017/0169954 A1* | 6/2017 | Ota | H01G 4/232 |
| 2018/0158614 A1* | 6/2018 | Park | H01G 4/30 |
| 2019/0027312 A1* | 1/2019 | Muramatsu | H01G 4/12 |
| 2019/0148068 A1* | 5/2019 | Lee | H01G 4/232 |
| | | | 361/301.4 |
| 2020/0343050 A1* | 10/2020 | Kirk | H01G 4/40 |

* cited by examiner

MULTILAYER ELECTRONIC COMPONENT

CROSS-REFERENCE TO RELATED APPLICATION

This application claims benefit of priority to Korean Patent Application No. 10-2021-0187671 filed on Dec. 24, 2021 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a multilayer electronic component, is a chip-type condenser mounted on the printed circuit boards of various electronic products such as display devices including liquid crystal displays (LCDs) and plasma display panels (PDPs), computers, smartphones, cell phones, and the like, to allow electricity to be charged therein and discharged therefrom.

The MLCC, which is advantageously compact, ensures high capacitance, and facilitates mounting, may be used as a component of various types of electronic devices. As various electronic devices such as computers and mobile devices have been miniaturized and implemented with high power, demand for miniaturization and high capacitance of multilayer ceramic capacitors has increased.

In particular, application processors (APs) of smartphones have had higher performance every year, and as an operating frequency and current consumption of APs increase, a voltage fluctuation frequency is increased and a high frequency component is increased.

In order to reduce the frequency of voltage fluctuations and high-frequency noise of the high-performance APs, it is necessary to lower source impedance.

In particular, source impedance is significantly affected by the performance of a decoupling capacitor. Therefore, in order to lower source impedance, it is necessary to use a low equivalent series inductance (ESL) MLCC having low inductance, and the importance thereof has gradually increased.

In addition, as the area of a camera and a battery of smartphones increases, a space of a main board for mounting passive components is decreased. Therefore, the need to minimize a mounting space occupied by the passive components in the main board by miniaturizing the passive components is increased.

SUMMARY

An aspect of the present disclosure may provide a multilayer electronic component having low equivalent series inductance (ESL).

An aspect of the present disclosure may also provide a multilayer electronic component for minimizing a mounting space.

According to one aspect of the present disclosure, a multilayer electronic component may include a first internal electrode layer including a first dielectric layer and first to fourth internal electrodes disposed to be spaced apart from each other on the first dielectric layer, a second internal electrode layer including a second dielectric layer and a fifth internal electrode disposed on the second dielectric layer, a body including a capacitance forming portion in which the first internal electrode layer and the second internal electrode layer are alternately disposed, a connection electrode penetrating through the first and second internal electrode layers, spaced apart from the first to fourth internal electrodes, and connected to the fifth internal electrode, first to fourth external electrodes disposed to be connected to the first to fourth internal electrodes, respectively, on the body, and a fifth external electrode disposed to be connected to the connection electrode on the body.

According to another aspect of the present disclosure, a multilayer electronic component may include a body including a capacitance forming portion in which a first internal electrode layer and a second internal electrode layer are alternately disposed, and having first and second surfaces opposing each other in a first direction and four side surfaces connecting the first and second surfaces to each other; the first internal electrode layer including a first dielectric layer and a plurality of first internal electrodes disposed to be spaced apart from each other on the first dielectric layer, each of the plurality of first internal electrodes having a lead portion connected to two adjacent surfaces of the four side surfaces at a corner of the body; the second internal electrode layer including a second dielectric layer and a second internal electrode disposed on the second dielectric layer; a connection electrode penetrating through the first and second internal electrode layers, spaced apart from the plurality of first internal electrodes, and connected to the second internal electrode; a plurality of first external electrodes disposed at corners of the body to be connected to the plurality of first internal electrodes, respectively, through the respective lead portions of the plurality of first internal electrodes; and a second external electrode disposed to be connected to the connection electrode on the body.

According to still another aspect of the present disclosure, a multilayer electronic component may include a first internal electrode layer including a first dielectric layer and a plurality of first internal electrodes disposed to be spaced apart from each other on the first dielectric layer; a second internal electrode layer including a second dielectric layer and a second internal electrode disposed on the second dielectric layer; a body including a capacitance forming portion in which the first internal electrode layer and the second internal electrode layer are alternately disposed; a connection electrode penetrating through the first and second internal electrode layers, spaced apart from the plurality of first internal electrodes, and connected to the second internal electrode; a plurality of first external electrodes disposed to be connected to the plurality of first internal electrodes, respectively, on the body; and a second external electrode disposed to be connected to the connection electrode on the body. An area in which one of the plurality of first internal electrodes overlaps the second internal electrode in the first direction has a different size from an area in which another one of the plurality of first internal electrodes overlaps the second internal electrode in the first direction.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
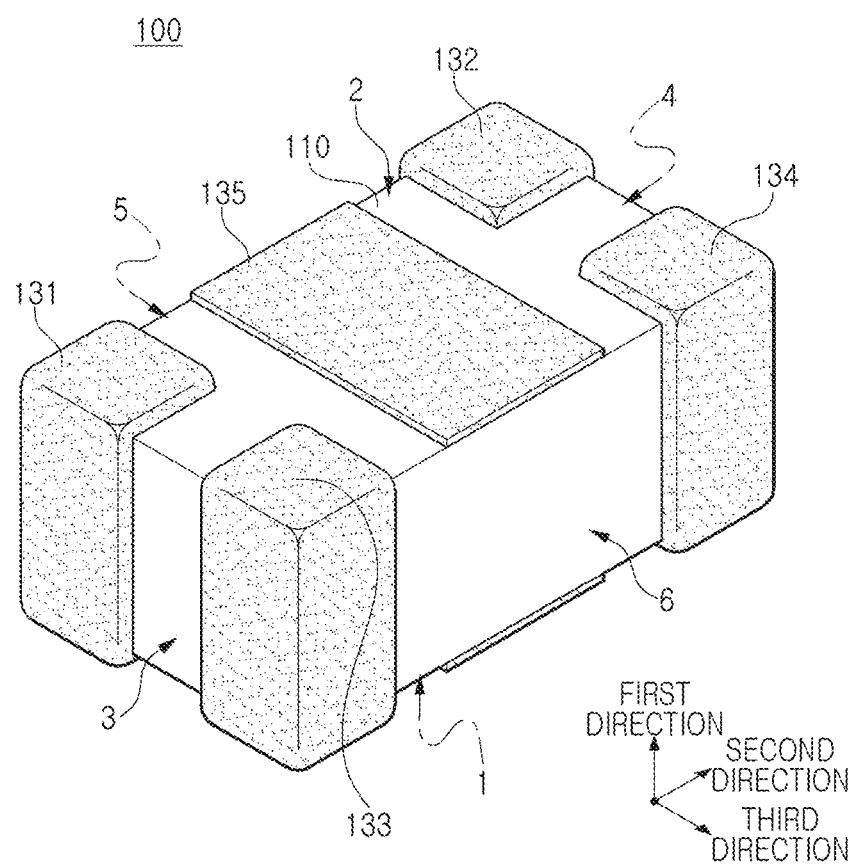
FIG. 1 is a perspective view illustrating a multilayer electronic component according to an exemplary embodiment in the present disclosure.

Hereinafter, exemplary embodiments of the present inventive concept will be described in detail with reference to the accompanying drawings. The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

To clarify the present invention, portions irrespective of description are omitted and like numbers refer to like elements throughout the specification, and in the drawings, the thickness of layers, films, panels, regions, and the like, are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements.

In the drawings, a first direction may be defined as a thickness (T) direction, a second direction may be defined as a length (L) direction, and a third direction may be defined as a width (W) direction.

FIG. 1 is a perspective view illustrating a multilayer electronic component according to an exemplary embodiment in the present disclosure.

Figure 2:
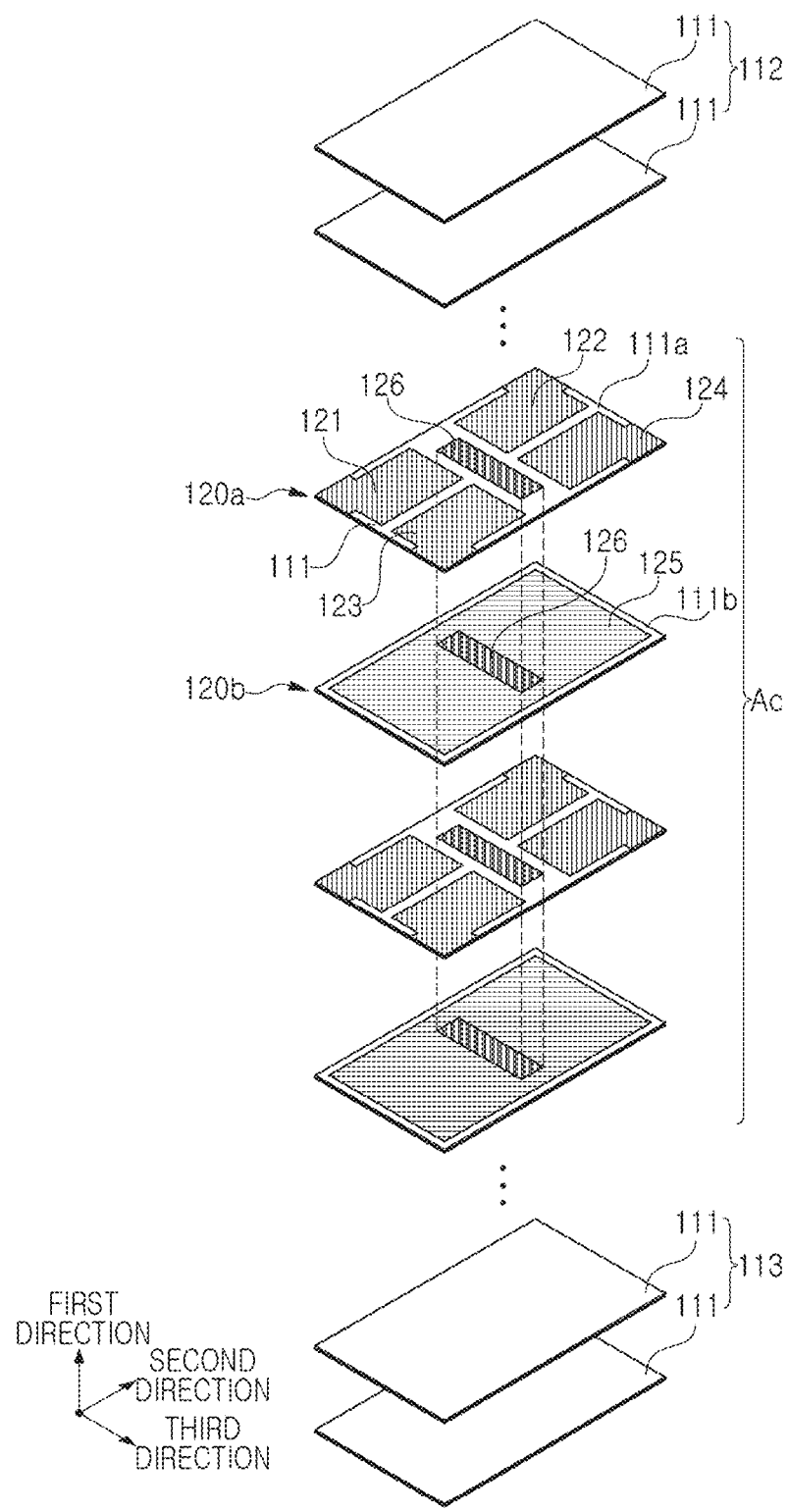
FIG. 2 is an exploded perspective view schematically illustrating an exploded body of the multilayer electronic component of FIG. 1.

FIG. 2 is an exploded perspective view schematically illustrating an exploded body of the multilayer electronic component of FIG. 1.

Figure 3:
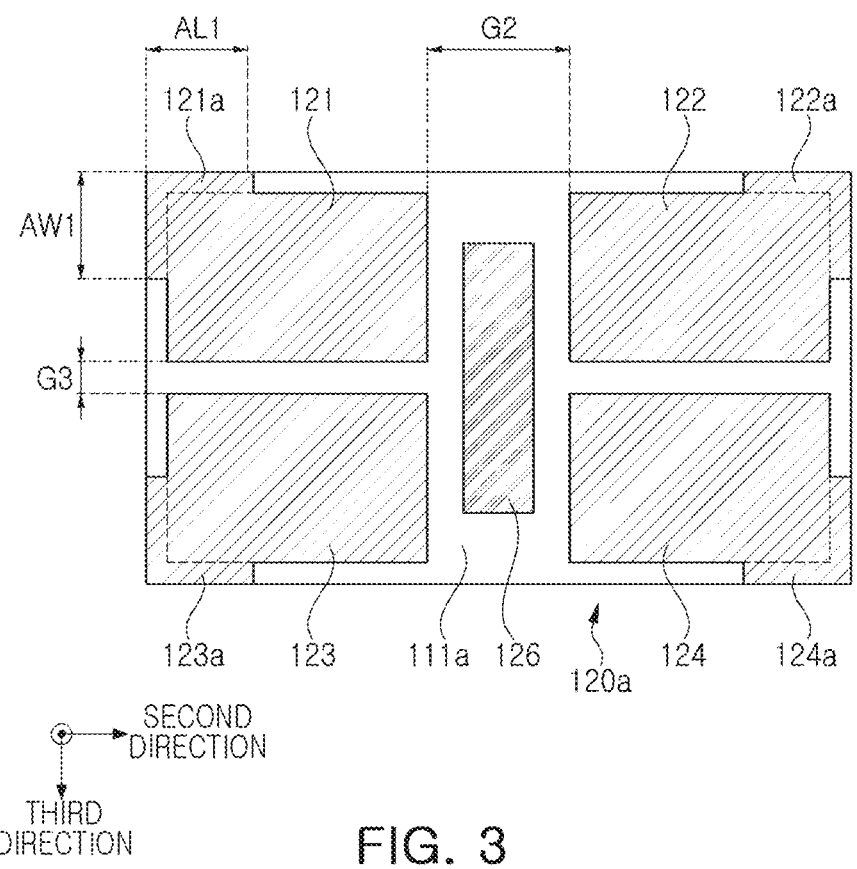
FIG. 3 is a view illustrating a first internal electrode layer of the multilayer electronic component of FIG. 1.

FIG. 3 is a view illustrating a first internal electrode layer of the multilayer electronic component of FIG. 1.

Figure 4:
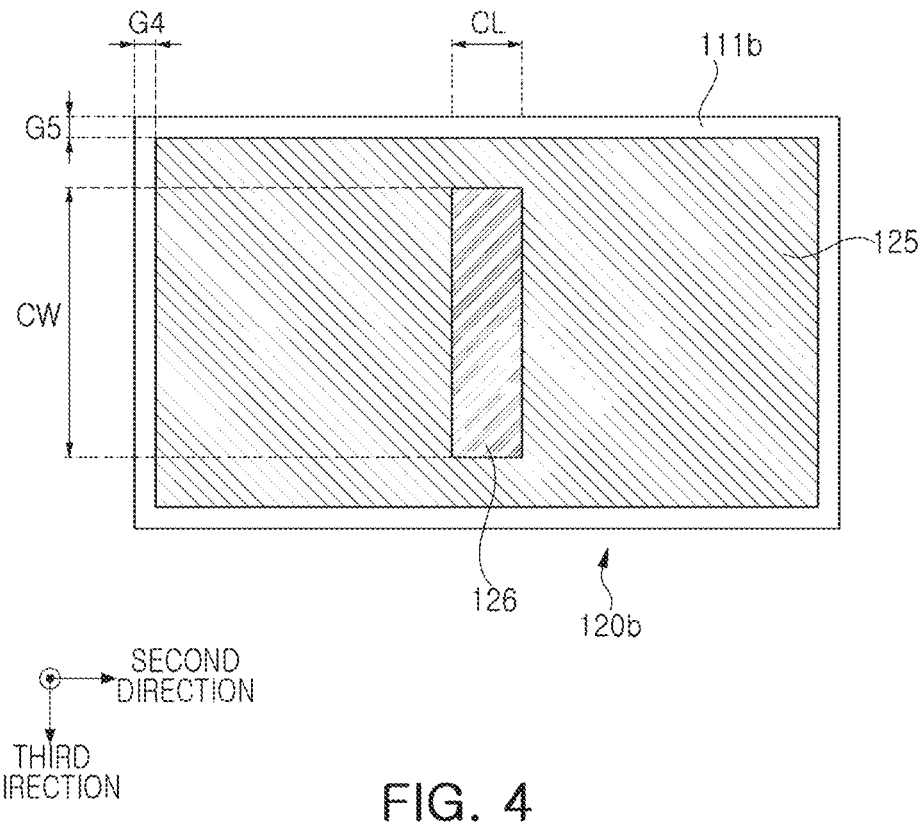
FIG. 4 is a view illustrating a second internal electrode layer of the multilayer electronic component of FIG. 1.

FIG. 4 is a view illustrating a second internal electrode layer of the multilayer electronic component of FIG. 1.

Figure 5:
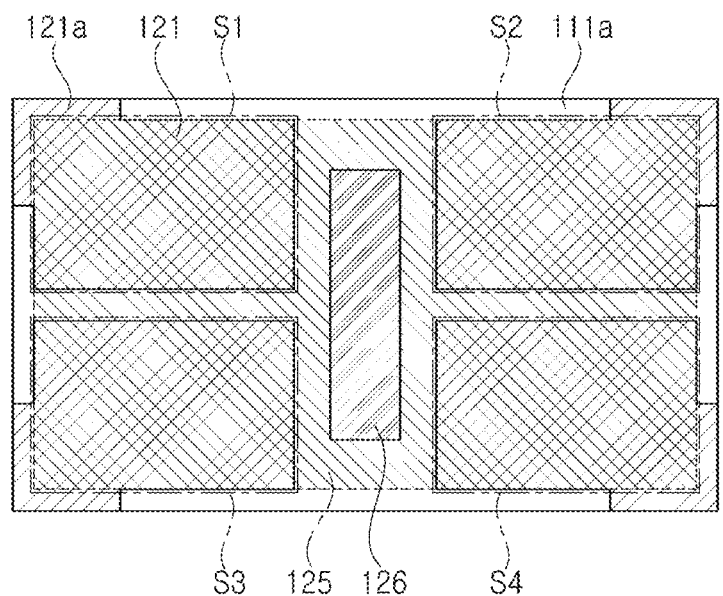
FIG. 5 is a view illustrating FIGS. 3 and 4 in an overlapping manner.

FIG. 5 is a view illustrating FIGS. 3 and 4 in an overlapping manner.

Figure 6:
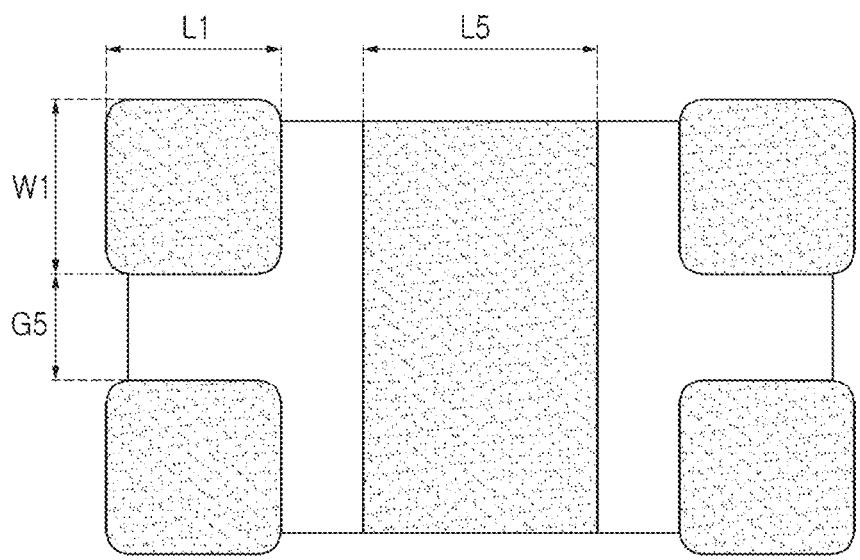
FIG. 6 is a plan view of the multilayer electronic component of FIG. 1 as viewed from the top of a first surface of a body.

FIG. 6 is a plan view of the multilayer electronic component of FIG. 1 as viewed from the top of a first surface of a body.

Hereinafter, a multilayer electronic component 100 according to an exemplary embodiment in the present disclosure will be described with reference to FIGS. 1 to 6.

The multilayer electronic component 100 according to the exemplary embodiment in the present disclosure includes a first internal electrode layer 120a including a first dielectric layer 111a and first to fourth internal electrodes 121, 122, 123, and 124 disposed to be spaced apart from each other on the first dielectric layer, a second internal electrode layer 120b including a second dielectric layer 111b and a fifth internal electrode 125 disposed on the second dielectric layer, a body 110 including a capacitance forming portion Ac in which the first internal electrode layer 120a and the second internal electrode layer 120b are alternately disposed, a connection electrode 126 penetrating through the first and second internal electrode layers 120a and 120b, spaced apart from the first to fourth internal electrodes 121, 122, 123, and 124, and connected to the fifth internal electrode 125, first to fourth external electrodes 131, 132, 133, and 134 disposed to be connected to the first to fourth internal electrodes 121, 122, 123, and 124, respectively, on the body 110, and a fifth external electrode 135 disposed to be connected to the connection electrode 126 on the body 110.

There is no particular limitation to a specific shape of the body 110 but, as shown, the body 110 may have a hexahedral shape or a shape similar thereto. Due to contraction (or shrinkage) of ceramic powder particles included in the body 110 during a firing process, the body 110 may have a substantially hexahedral shape, but may not have a hexahedral shape with perfectly straight lines.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 forming the body 110 are in a sintered state, and adjacent dielectric layers 111 may be integrated such that boundaries therebetween may not be readily apparent without using a scanning electron microscope (SEM). The plurality of dielectric layers 111 may include the first dielectric layer 111a on which the first to fourth internal electrodes 121, 122, 123, and 124 are disposed and the second dielectric layer 111b on which the fifth internal electrode 125 is disposed, and may include a dielectric layer in which no internal electrode is disposed.

According to an exemplary embodiment in the present disclosure, a raw material for forming the dielectric layer 111 is not limited as long as sufficient electrostatic capacitance may be obtained. For example, a barium titanate-based material, a lead composite perovskite-based material, or a strontium titanate-based material may be used. The barium titanate-based material may include a $BaTiO_3$-based ceramic powder particles, and the ceramic powder particles may include $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1).

As a material for forming the dielectric layer 111, various ceramic additives, organic solvents, binders, dispersants, and the like may be added to the powder particles such as barium titanate ($BaTiO_3$) according to purposes of the present disclosure.

Meanwhile, a thickness of the dielectric layer 111 is not particularly limited. However, since thinner dielectric layer 111 is advantageous for miniaturization and high capacitance, the thickness of the dielectric layer may be 0.6 μm or less.

The body 110 may include a capacitance forming portion Ac disposed inside the body 110 and including the first internal electrode layer 120a and the second internal electrode layer 120b alternately disposed to form capacitance and cover portions 112 and 113 formed on upper and lower surfaces of the capacitance forming portion Ac in the first direction.

The cover portions 112 and 113 include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by stacking a single dielectric layer or two or more dielectric layers on upper and lower surfaces of the capacitance forming portion Ac in the thickness direction, respectively, and may serve to prevent damage to the internal electrodes due to physical or chemical stress.

The upper cover portion 112 and the lower cover portion 113 may not include an internal electrode and may include the same material as that of the dielectric layer 111.

That is, the upper cover portion 112 and the lower cover portion 113 may include a ceramic material, for example, a barium titanate ($BaTiO_3$)-based ceramic material.

Meanwhile, the average thickness of the cover portions 112 and 113 is not particularly limited. However, the thickness of the cover portions 112 and 113 may be 15 μm or less in order to more easily achieve miniaturization and high capacitance of the multilayer electronic component. The thickness of the cover portions 112 and 113 may refer to a size in the first direction and may be a value obtained by averaging sizes of the cover portions 112 and 113 in the first direction measured at five points at equal intervals above or below the capacitance forming portion Ac.

Application processors (APs) of the smartphones have had higher performance every year, and as an operating frequency and current consumption of the APs increase, a voltage fluctuation frequency is increased and a high frequency component is increased. In order to reduce the frequency of voltage fluctuations and high-frequency noise of the high-performance APs, it is necessary to lower source impedance. In particular, source impedance is significantly affected by the performance of a decoupling capacitor. Therefore, in order to lower source impedance, it is necessary to use a low ESL MLCC having low inductance. In addition, as the area of a camera and of a battery for smartphones increases, a space of a main board for mounting passive components is decreased. Therefore, the need to minimize a mounting space occupied by the passive components in the main board by miniaturizing the passive components is increased.

In order to lower ESL (equivalent series inductance), it is necessary to increase the number of external electrodes and reduce a distance between external electrodes to reduce a current loop.

Conventional Low ESL MLCCs include 3-terminal products and 8-terminal products. However, there is a limit to reducing the current loop with the 3-terminal product, and in the case of the 8-terminal product, a short circuit between the terminals may be prevented when a distance between the terminals is maintained at a certain level or more, and thus, there is a limitation in reducing a chip size. Meanwhile, the multilayer electronic component according to an exemplary embodiment in the present disclosure is in the form of a 5-terminal component, enabling a reduction in the chip size, while lowering ESL.

The capacitance forming portion Ac is a portion contributing to capacitance formation of the capacitor, and may be formed by alternately and repeatedly stacking the first internal electrode layers 120a and the second internal electrode layers 120b. In this case, the first and second internal electrode layers 120a and 120b may be alternately disposed in the first direction.

The capacitance forming portion Ac includes a first capacitance forming portion in which the first internal electrode 121 and the fifth internal electrode 125 overlap to form capacitance, a second capacitance forming portion in which the second internal electrode 122 and the fifth internal electrode 125 overlap to form capacitance, a third capacitance forming portion in which the third internal electrode 123 and the fifth internal electrode 125 overlap to form capacitance, and a fourth capacitance forming portion in which the fourth internal electrode 124 and the fifth internal electrode 125 overlap to form capacitance. Accordingly, the effect obtained by connecting four two-terminal capacitors may be realized with the single multilayer electronic component 100, thereby simplifying a process during mounting and reducing a mounting area. In addition, as will be described later, since the capacitance of the first capacitance forming portion and the capacitance of the second capacitance forming portion may be designed to be different, thereby implementing more diverse levels of capacitance.

Referring to FIG. 5, the capacitance formed by the first to fourth capacitance forming portions may be determined by areas S1, S2, S3, and S4 in which the first to fourth internal electrodes 121, 122, 123, and 124 overlap the fifth internal electrode 125, respectively.

Referring to FIG. 3, the first internal electrode layer 120a may include the first dielectric layer 111a and the first to fourth internal electrodes 121, 122, 123 and 124 disposed on the first dielectric layer 111a to be spaced apart from each other. The first to fourth internal electrodes 121, 122, 123, and 124 are spaced apart from each other and may be electrically insulated from each other. The first to fourth internal electrodes 121, 122, 123, and 124 may be connected to the first to fourth external electrodes 131, 132, 133 and 134, respectively.

In an exemplary embodiment, the first internal electrode 121 may be connected to the first external electrode 131 through a first lead portion 121a connected to the third and fifth surfaces, the second internal electrode 122 may be connected to the second external electrode 132 through a second lead portion 122a connected to the fourth and fifth surfaces, the third internal electrode 123 may be connected to the third external electrode 133 through a third lead portion 123a connected to the third and sixth surfaces, and the fourth internal electrode 124 may be connected to the fourth external electrode 134 through a fourth lead portion 124a connected to the fourth and sixth surfaces.

The lead portions 121a, 122a, 123a, and 124a may be disposed at corners in cross-sections taken in the second and third directions. In addition, by controlling a width and/or length of the lead portions 121a, 122a, 123a, and 124a connected to the outer surface of the body 110, the size of the external electrodes 131, 132, 133, and 134 may be controlled, so that a short circuit between the external electrodes 131, 132, 133, and 134 may be more effectively prevented. Accordingly, the size of the multilayer electronic component may be further reduced.

Meanwhile, a gap G2 between the first internal electrode 121 and the second internal electrode 122 is not particularly limited, but may be 200 μm or more to prevent a short circuit because the connection electrode 126 is disposed between the first internal electrode 121 and the second internal electrode 122. Also, a gap G3 between the first internal electrode 122 and the third internal electrode 123 is not particularly limited, but may be 50 μm or more to prevent a short circuit.

In addition, a width AW1 of the first lead portion connected to the third surface and a length AL1 of the first lead portion connected to the fifth surface are not particularly limited, but may each be 150 μm or less in order to prevent a short circuit between the external electrodes.

The second internal electrode layer 120b may include the second dielectric layer 111b and the fifth internal electrode 125 disposed on the second dielectric layer 111b.

The fifth internal electrode 125 may be spaced apart from the third to fifth surfaces of the body 110 to be electrically insulated from the first to fourth external electrodes 131, 132, 133, and 134. Also, the fifth internal electrode 125 may be electrically connected to the fifth external electrode 135 through the connection electrode 126 penetrating through the second internal electrode layer 120b.

Meanwhile, a distance G4 between the fifth internal electrode 125 and the third surface and a distance G5 between the fifth internal electrode 125 and the fifth surface are not particularly limited, but may each be 30 μm or more to prevent a short circuit between the fifth internal electrode 125 and the first to fourth external electrodes 131, 132, 133 and 134.

The connection electrode 126 may penetrate through the first and second internal electrode layers 120a and 120b, may be spaced apart from the first to fourth internal electrodes 121, 122, 123, and 124, and may be connected to the fifth internal electrode 125. The connection electrode 126 may serve to reduce ESL by reducing a current loop. The connection electrode 126 may penetrate through the first and second internal electrode layers 120a and 120b in the first direction.

A shape of the connection electrode 126 is not particularly limited. For example, as illustrated in FIGS. 2 to 5, the connection electrode 126 may have a quadrangular shape in cross-sections taken in the second and third directions. When the connection electrode 126 has a quadrangular shape, it may be easy to minimize a current loop, thus being advantageous to reduce ESL. In this case, the size of the quadrangular shape is not particularly limited, but for example, the quadrangular shape may have a second directional size CL of 100 μm and a third directional size CW of 400 μm.

Figure 7:
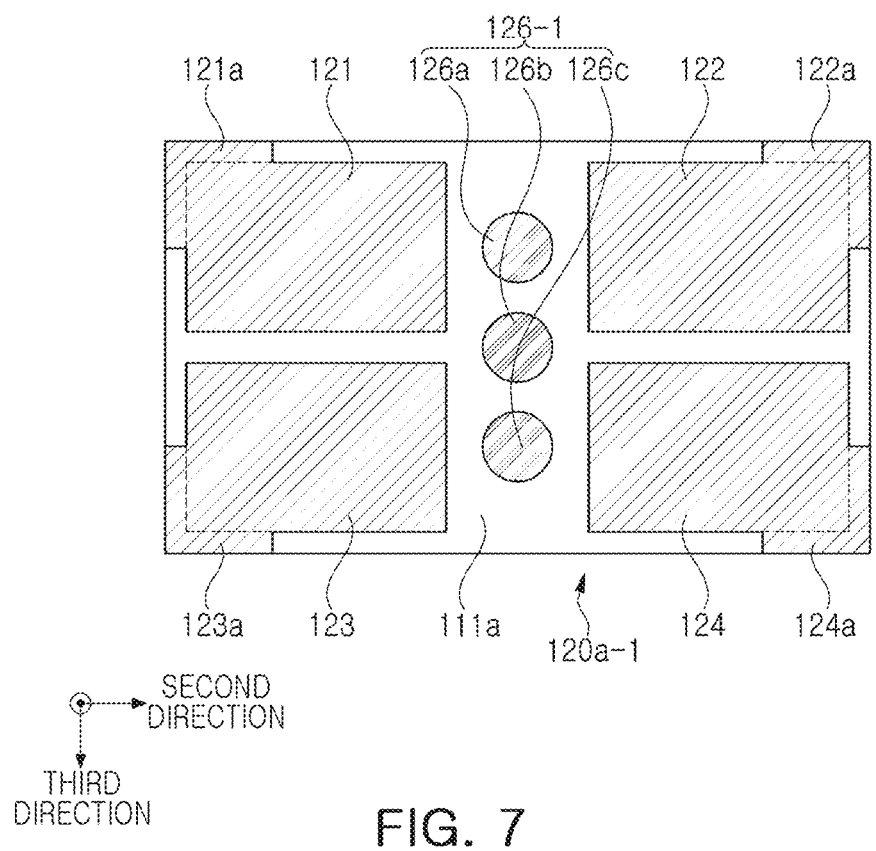
FIGS. 7 and 8 are views illustrating a first internal electrode layer and a second internal electrode layer according to a modified example of the present disclosure.
Figure 8:
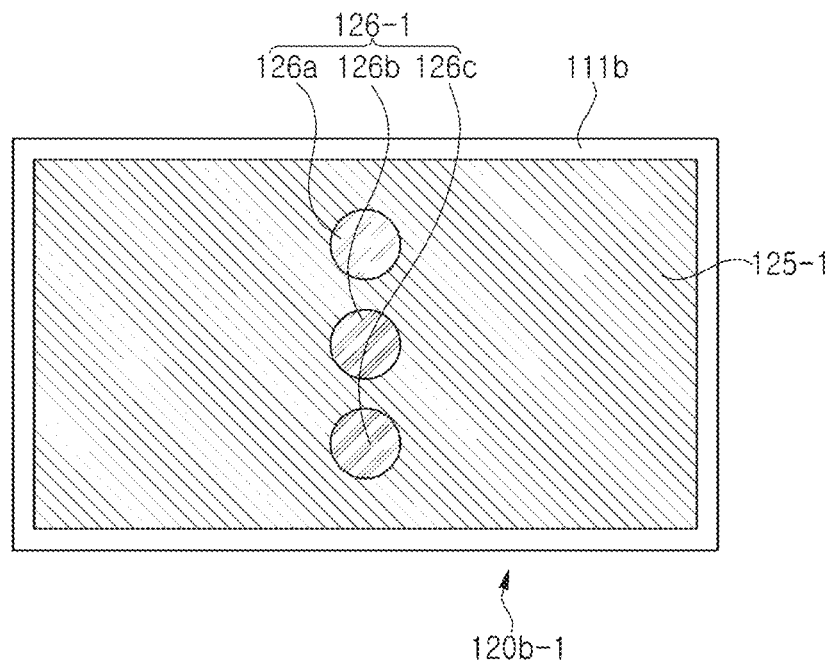

Meanwhile, referring to FIGS. 7 and 8 illustrating a first internal electrode layer 120a-1 and a second internal electrode layer 120b-1 according to a modified example of the present disclosure, a plurality of connection electrodes 126a, 126b, and 126c are disposed to further improve electrical connectivity, and three connection electrodes 126a, 126b, and 126c may be arranged side by side in the third direction as illustrated.

In addition, the connection electrodes 126a, 126b, and 126c may be circular in cross-sections taken in the second and third directions. The connection electrodes 126a, 126b, and 126c may be formed by forming a via in the body 110 and then filling the via with a conductive material. Circular connection electrodes 126a, 126b, and 126c may be advantageous for via formation.

The body 110 may be formed by alternately stacking ceramic green sheets on which the first to fourth internal electrodes 121, 122, 123, and 124 are printed and ceramic green sheets on which the fifth internal electrode 125 is printed, and then sintering a stack body.

A material for forming the internal electrodes 121, 122, 123, 124, and 125 is not particularly limited, and a material having excellent electrical conductivity may be used. For example, the internal electrodes 121, 122, 123, 124, and 125 may include one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121, 122, 123, 124, and 125 2 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti), or alloys thereof on a ceramic green sheet. As a printing method of the conductive paste for internal electrodes, a screen printing method or a gravure printing method may be used but the present disclosure is not limited thereto.

Meanwhile, the thickness of the internal electrodes 121, 122, 123, 124, and 125 are not particularly limited. However, thinner internal electrodes 121, 122, 123, 124, and 125 are advantageous for miniaturization and high capacitance, the thickness of the internal electrodes 121, 122, 123, 124, and 125 may be 0.6 μm or less.

The first to fourth external electrodes 131, 132, 133, and 134 may be disposed on the body 110 to be respectively connected to the first to fourth internal electrodes 121, 122, 123 and 124, and the fifth external electrode 125 may be disposed on the body 110 to be connected to the connection electrode 126. The first to fifth external electrodes 131, 132, 133, 134, and 135 may be disposed to be spaced apart from each other.

In an exemplary embodiment, the first external electrode 131 may be disposed on the third and fifth surfaces, the second external electrode 132 may be disposed on the fourth and fifth surfaces, the third external electrode 133 may be disposed on the third and sixth surfaces, the fourth external electrode 134 may be disposed on the fourth and sixth surfaces, and the fifth external electrode 135 may be disposed on at least one of the first and second surfaces. Accordingly, since it is easy to maintain a distance between the first to fifth external electrodes, which is advantageous in preventing a short circuit between terminals compared to the conventional 8-terminal type, and thus being advantageous in miniaturization of the chip size.

Figure 16:
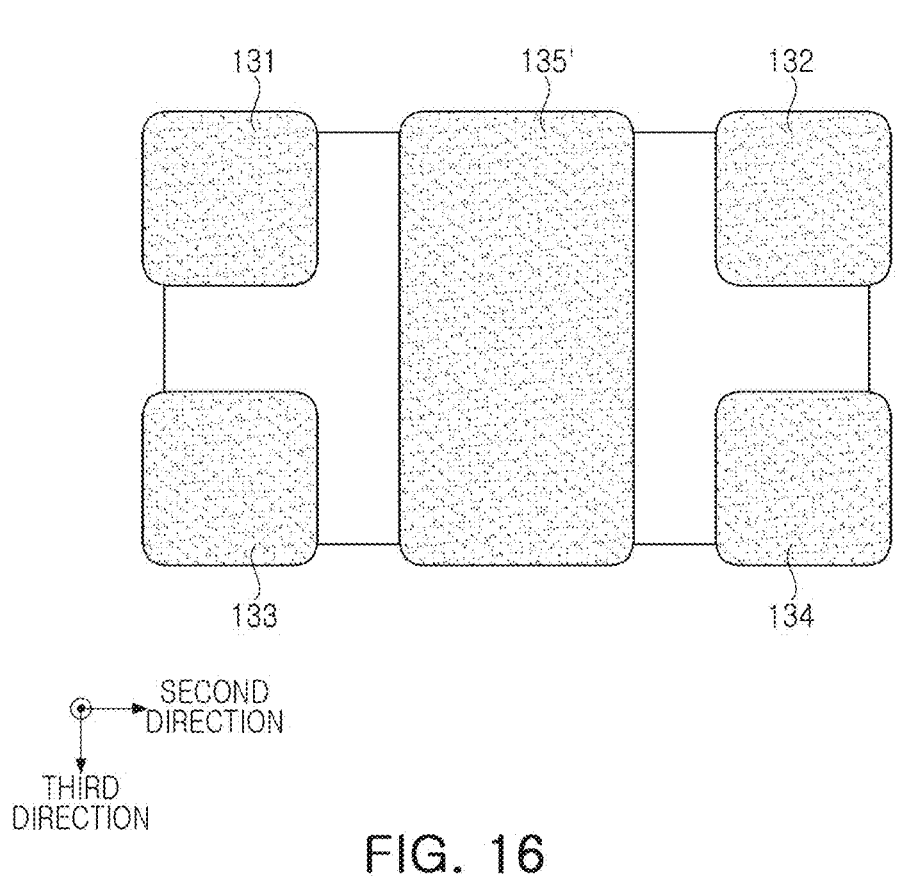
FIG. 16 is a plan view of a modified example of the multilayer electronic component as viewed from the top of a first surface of a body.

In this case, the fifth external electrode 135 may be disposed on the first and second surfaces, and the connection electrode 126 may penetrate through the body 110 in the first direction to be connected to the fifth external electrode 135 on the first and second surfaces. In addition, referring to FIG. 16, the fifth external electrode 135' may be disposed to surround the first, second, fifth, and sixth surfaces and be connected to each other.

Referring to FIG. 6, the gap G5 between the first external electrode 131 and the third external electrode 133 is not particularly limited, but may be 100 μm or more to prevent a short circuit. Also, a third directional size W1 and a second directional size L1 of the first external electrode are not particularly limited, but may each be 250 μm or less to prevent a short circuit with an adjacent external electrode. Also, the size L5 of the fifth external electrode 135 in the second direction may be 350 μm or less.

Meanwhile, the external electrodes 131, 132, 133, 134, 135 may be formed using any material as long as the material has electrical conductivity, such as metal, and specific materials may be determined in consideration of electrical characteristics and structural stability, and further may have a multilayer structure.

The external electrodes 131, 132, 133, 134, and 135 may be sintered electrodes including a conductive metal and glass, or resin-based electrodes including a conductive metal and a resin.

Also, the external electrodes 131, 132, 133, 134, and 135 may have a form in which a sintered electrode and a resin-based electrode are sequentially formed on the body. In addition, the external electrodes 131, 132, 133, 134, and 135 may be formed by transferring a sheet including a conductive metal onto the body or by transferring a sheet including a conductive metal onto the sintered electrode.

As the conductive metal included in the external electrodes 131, 132, 133, 134, and 135, a material having excellent electrical conductivity may be used, and the material is not particularly limited. For example, the conductive metal may be one or more of Cu, Ni, Pd, Ag, Sn, Cr, or alloys thereof.

In addition, the external electrodes 131, 132, 133, 134, and 135 may include a plating layer to improve mounting characteristics. A type of the plating layer is not particularly limited, and may be a plating layer including at least one of Ni, Sn, Pd, and alloys thereof, and may be formed of a plurality of layers. As a more specific example of the plating layer, the plating layer may be a Ni plating layer or a Sn plating layer, and may have a form in which the Ni plating layer and the Sn plating layer are sequentially formed.

In an exemplary embodiment, the area S1 in which the first internal electrode 121 and the fifth internal electrode 125 overlap each other may be different from an area in which any one of the second to fourth internal electrodes 122 to 124 and the fifth internal electrode 125 overlap each other.

Also, when the overlapping areas of the first to fourth internal electrodes 121, 122, 123, and 124 and the fifth internal electrode 125 are S1 to S4, respectively, S1 to S4 may have different values. Accordingly, an effect that four two-terminal capacitors having different levels of capacitance are connected may be obtained.

A method for implementing S1 to S4 with different values is not particularly limited.

Figure 9:
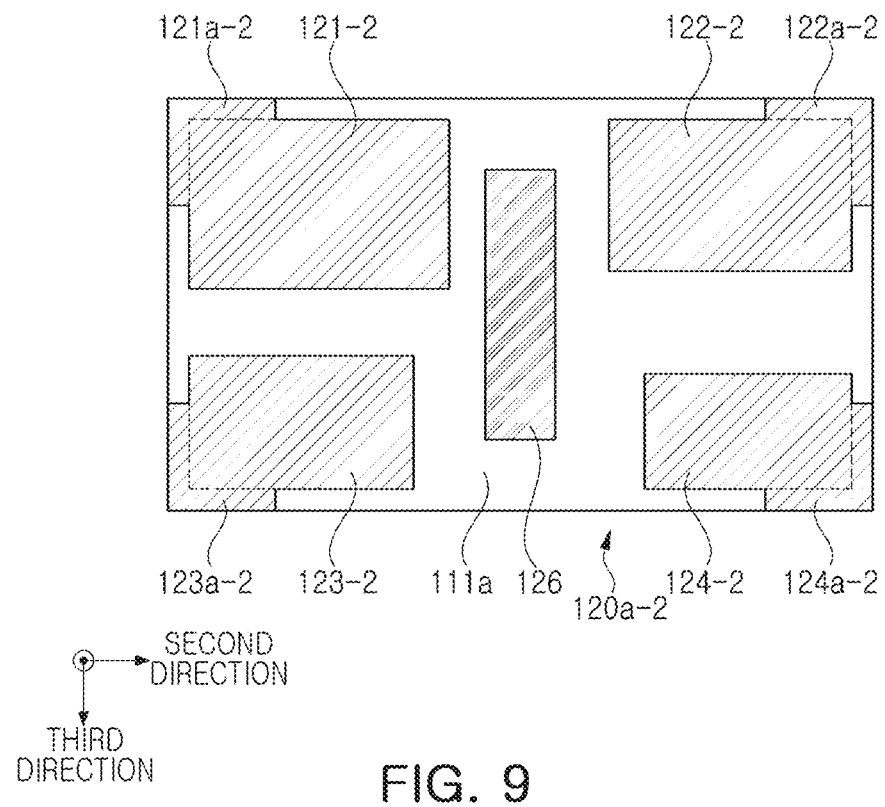
FIG. 9 is a view illustrating a modified example of a first internal electrode layer.

For example, as illustrated in FIGS. 9, S1 to S4 may be controlled by differentiating the areas of the first to fourth internal electrodes 121-1, 121-2, 121-3, and 121-4 included in the first internal electrode layer 120a-2 and alternately disposing the first internal electrode layer 120a-2 with the second internal electrode 120b of FIG. 4.

Figure 10:
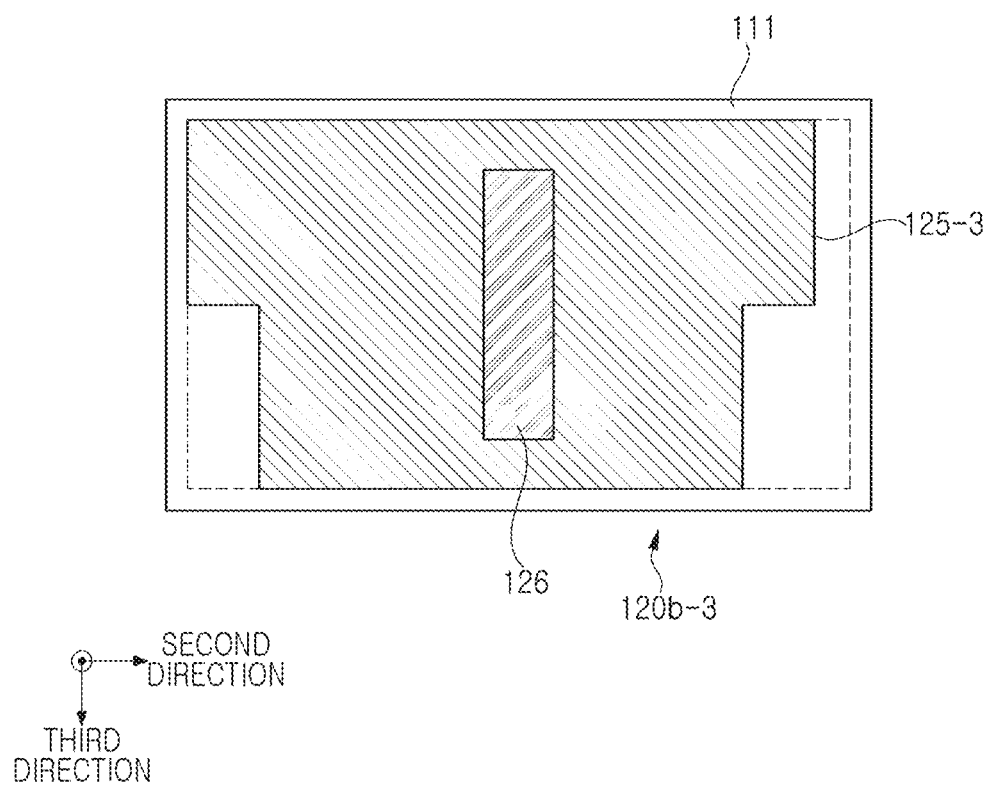
FIG. 10 is a diagram illustrating a modified example of a second internal electrode layer.

As another example, as illustrated in FIGS. 10, S1 to S4 may be controlled by alternately disposing the second internal electrode layer 120b-3 with the first internal electrode layer 120a of FIG. 3 by controlling the shape of the fifth internal electrode 125-3 included in the second internal electrode layer 120b-3 to be different from the area in which the first to fourth internal electrodes overlap each other.

In addition, S1 to S4 may be controlled by alternately disposing the first internal electrode layer 120a-2 illustrated in FIG. 9 and the second internal electrode layer 120b-3 illustrated in FIG. 10.

Figure 15:
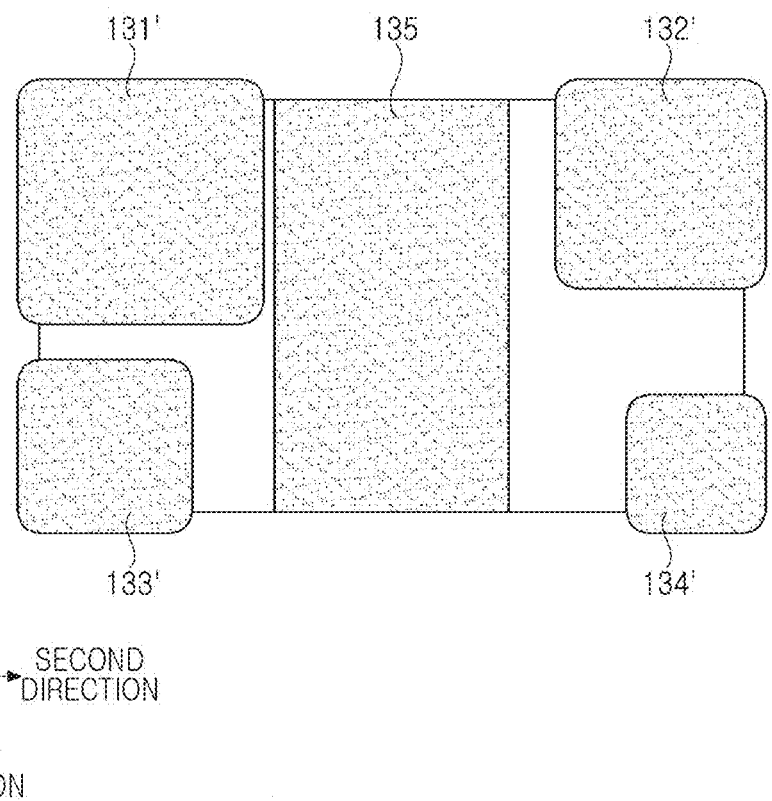
FIG. 15 is a plan view of a modified example of the multilayer electronic component as viewed from the top of a first surface of a body.

Meanwhile, when S1 to S4 have different values, referring to FIG. 15, the sizes of the first to fourth external electrodes 131', 132', 133', and 134' in the second or third direction may be different from each other so that the multilayer electronic component 100 may be easily identified externally. Also, in order to make the sizes of the first to fourth external electrodes 131', 132', 133', and 134' in the second or third direction to be different, the width or length of the first to fourth lead portions 121a, 122a, 123a, and 124a connected to the outer surface of the body 110 may be controlled.

A size of the multilayer electronic component 100 is not particularly limited.

However, according to an exemplary embodiment in the present disclosure, since it is easy to maintain a gap between the first to fifth external electrodes, which is advantageous in preventing a short circuit between terminals, compared to the conventional 8-terminal type, it is more advantageous for miniaturization of the chip size. When an 8-terminal low ESL MLCC is manufactured to have a 1608 size (length× width, 1.6 mm×0.8 mm) or less, there is a risk of a short circuit between terminals. Therefore, in the multilayer electronic component 100 having 1005 size (length×width, 1.0 mm×0.5 mm) or less, the effect of reducing ESL and minimizing the mounting space according to the present disclosure may be more remarkable.

Considering a manufacturing error and the external electrode size, when the length of the ceramic electronic component 100 is 1.1 mm or less and the width thereof is 0.55 mm or less, the effect of reducing ESL and minimizing the mounting space according to the present disclosure may be more remarkable. Here, the length of the multilayer electronic component 100 refers to a maximum size of the multilayer electronic component 100 in the second direction, and the width of the multilayer electronic component 1000 refers to a maximum size of the multilayer electronic component 1000 in the third direction.

Example

As the Inventive Example, a 5-terminal MLCC having a 1005 size and a nominal capacitance of 4.7 μF was prepared. As Comparative Example 1, a 3-terminal MLCC having a 1005 size and a nominal capacitance of 4.7 μF was prepared.

Figure 11:
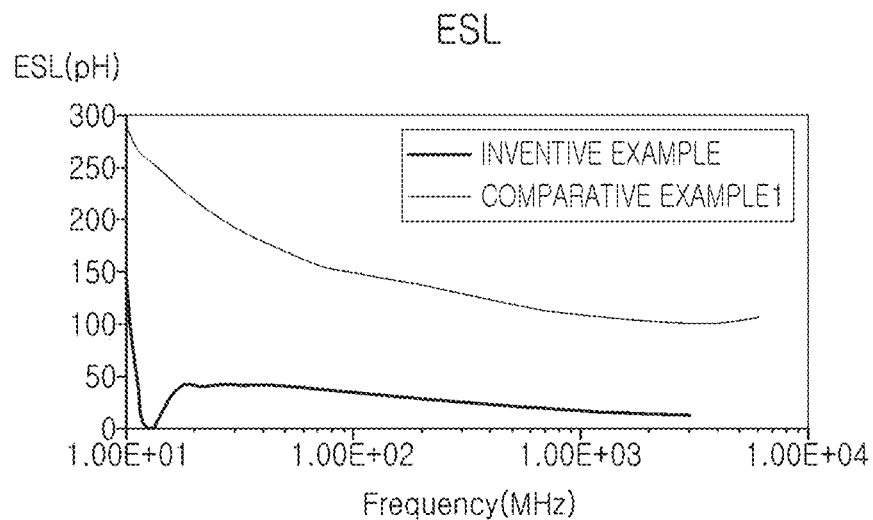
FIG. 11 is a graph illustrating equivalent series inductance (ESL) according to a frequency change of Inventive Example and Comparative Example 1.
Figure 12:
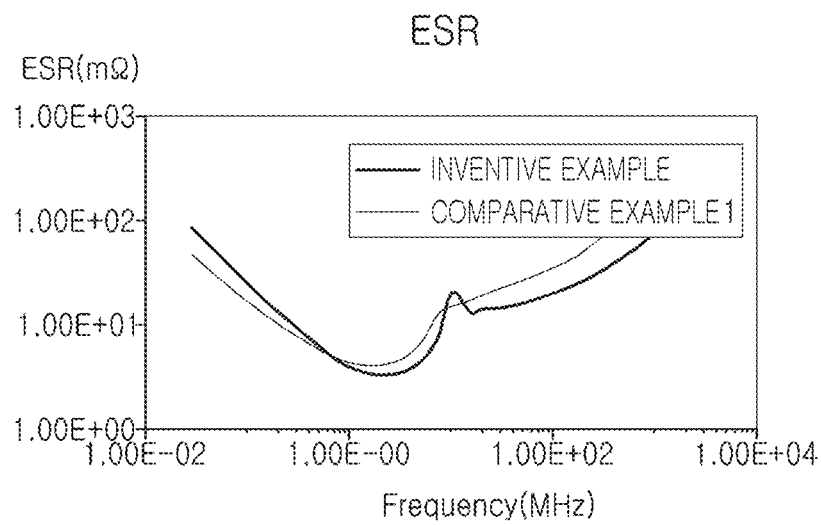
FIG. 12 is a graph illustrating equivalent series resistance (ESR) according to a frequency change of Inventive Example and Comparative Example 1.
Figure 13:
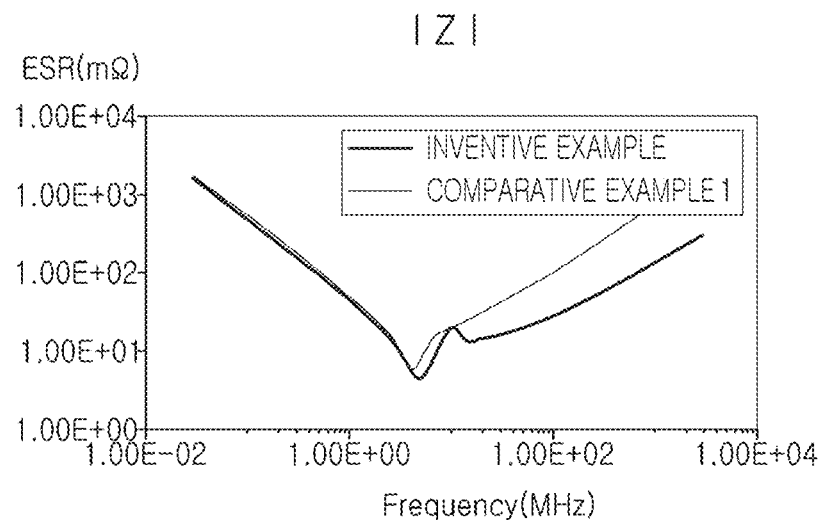
FIG. 13 is a graph illustrating impedance according to a frequency change of Inventive Example and Comparative Example 1.

FIGS. 11 to 13 are measurements of equivalent series inductance (ESL), equivalent series resistance (ESR), and impedance of Inventive Example and Comparative Example 1 according to a frequency change with an impedance analyzer. In addition, an effective capacitance, ESR, ESL (average value, pH) and ESL (1 GHz, pH) of Inventive Example and Comparative Example 1 were measured and described in Table 1 below. Referring to Table 1 and FIGS. 11 to 13, it can be seen that Inventive Example has superior capacity, ESL, ESR, and impedance compared to Comparative Example 1.

TABLE 1

| | Effective capacitance (μF) | ESR (mΩ) | ESL (average value, pH) | ESL (1 GHz, pH) |
|---|---|---|---|---|
| Inventive Example | 3.265 | 4.32 | 42.86 | 17.69 |
| Comparative Example 1 | 3.035 | 5.56 | 176.46 | 109.18 |

In Comparative Example 2, 4 two-terminal MLCCs having a 1005 size and a nominal capacitance of 1.0 μF were connected in parallel. The ESL of the Inventive Example and Comparative Example 2 according to a frequency change was measured with an impedance analyzer and illustrated in FIG. 14. In addition, the effective capacitance, ESL (average value, pH), and ESL (1 GHz, pH) of Inventive Example and Comparative Example 2 were measured and described in Table 2 below.

TABLE 2

| | Effective capacitance (μF) | ESL (average value, pH) | ESL (1 GHz, pH) |
|---|---|---|---|
| Inventive Example | 3.265 | 42.86 | 17.69 |
| Comparative Example 2 | 2.718 | 45.82 | 33.46 |

Figure 14:
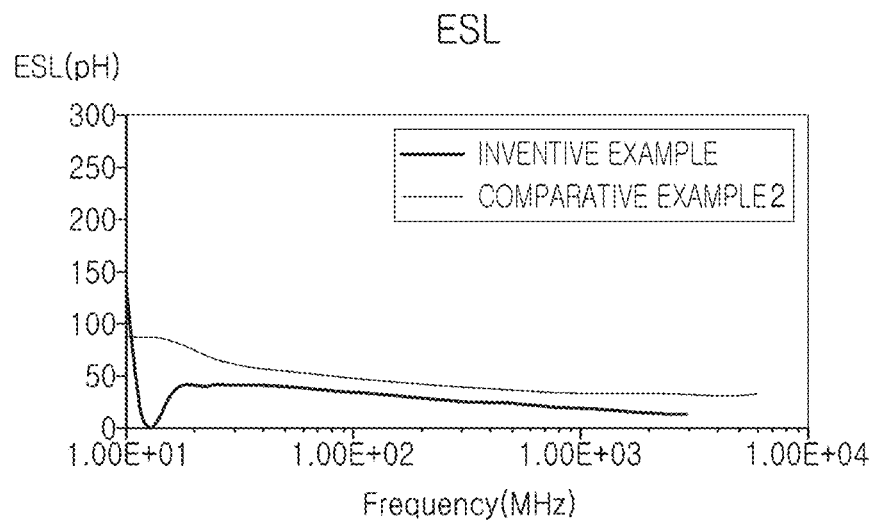
FIG. 14 is a graph illustrating ESL according to a frequency change of Inventive Example and Comparative Example 2.

Referring to Table 2 and FIG. 14, it can be seen that Inventive Example has superior capacity and ESL compared to Comparative Example 2. Furthermore, it can be seen that Inventive Example may replace four two-terminal MLCCs, and thus there is an effect of minimizing the mounting space.

One of the several effects of the present disclosure is to lower ESL by reducing a current loop.

One of several effects of the present disclosure is to provide a multilayer electronic component having the effect that four capacitors are connected, thereby minimizing a mounting space and reducing the number of mounting processes.

While exemplary embodiments have been illustrated and described above, it will be apparent to those skilled in the art that modifications and variations could be made without departing from the scope of the present disclosure as defined by the appended claims.

What is claimed is:

1. A multilayer electronic component comprising:
a first internal electrode layer including a first dielectric layer and first to fourth internal electrodes disposed to be spaced apart from each other on the first dielectric layer;
a second internal electrode layer including a second dielectric layer and a fifth internal electrode disposed on the second dielectric layer;
a body including a capacitance forming portion in which the first internal electrode layer and the second internal electrode layer are alternately disposed;
a connection electrode penetrating through the first and second internal electrode layers, spaced apart from the first to fourth internal electrodes, and connected to the fifth internal electrode;
first to fourth external electrodes disposed to be connected to the first to fourth internal electrodes, respectively, on the body; and
a fifth external electrode disposed to be connected to the connection electrode on the body.

2. The multilayer electronic component of claim 1, wherein the first and second internal electrode layers are alternately disposed in a first direction,
the body includes first and second surfaces opposing each other in the first direction, third and fourth surfaces connected to the first and second surfaces and opposing each other in a second direction, and fifth and sixth surfaces connected to the first to fourth surfaces and opposing each other in a third direction,
the connection electrode penetrates through the first and second internal electrode layers in the first direction, disposed to be spaced apart from the first to fourth internal electrodes, and connected to the fifth internal electrode.

3. The multilayer electronic component of claim 2, wherein the first external electrode is disposed on the third and fifth surfaces, the second external electrode is disposed on the fourth and fifth surfaces, the third external electrode is disposed on the third and sixth surfaces, the fourth external electrode is disposed on the fourth and sixth surfaces, and the fifth external electrode is disposed on at least one of the first and second surfaces.

4. The multilayer electronic component of claim 3, wherein
the first internal electrode is connected to the first external electrode through a first lead portion connected to the third and fifth surfaces,
the second internal electrode is connected to the second external electrode through a second lead portion connected to the fourth and fifth surfaces,
the third internal electrode is connected to the third external electrode through a third lead portion connected to the third and sixth surfaces, and
the fourth internal electrode is connected to the fourth external electrode through a fourth lead portion connected to the fourth and sixth surfaces.

5. The multilayer electronic component of claim 3, wherein,
when areas in which each of the first to fourth internal electrodes and the fifth internal electrode overlap each other are S1 to S4, respectively, S1 to S4 have different values from each other, and
sizes of the first to fourth external electrodes in the second or third direction are different from each other.

6. The multilayer electronic component of claim 2, wherein the connection electrode has a circular shape in cross-sections taken in the second and third directions.

7. The multilayer electronic component of claim 2, wherein the connection electrode has a quadrangular shape in cross-sections taken in the second and third directions.

8. The multilayer electronic component of claim 2, wherein
the fifth external electrode is disposed on the first and second surfaces, and
the connection electrode penetrates through the body in the first direction to be connected to the fifth external electrode disposed on the first and second surfaces.

9. The multilayer electronic component of claim 8, wherein the fifth external electrode is disposed to surround the first, second, fifth, and sixth surfaces and disposed to be spaced apart from the first to fourth external electrodes.

10. The multilayer electronic component of claim 2, wherein a maximum size of the multilayer electronic component in the second direction is 1.1 mm or less, and a maximum size of the multilayer electronic component in the third direction is 0.55 mm or less.

11. The multilayer electronic component of claim 1, wherein an area in which the first internal electrode and the fifth internal electrode overlap each other is different from an area in which any one of the second to fourth internal electrodes and the fifth internal electrode overlap each other.

12. The multilayer electronic component of claim 1, wherein, when areas in which each of the first to fourth internal electrodes and the fifth internal electrode overlap each other are S1 to S4, respectively, S1 to S4 have different values from each other.

13. The multilayer electronic component of claim 1, wherein the connection electrode are disposed in plural.

14. A multilayer electronic component comprising:
 a body including a capacitance forming portion in which a first internal electrode layer and a second internal electrode layer are alternately disposed, and having first and second surfaces opposing each other in a first direction and four side surfaces connecting the first and second surfaces to each other;
 the first internal electrode layer including a first dielectric layer and at least three first internal electrodes disposed to be spaced apart from each other on the first dielectric layer, each of the at least three first internal electrodes having a lead portion connected to two adjacent surfaces of the four side surfaces at a corner of the body;
 the second internal electrode layer including a second dielectric layer and a second internal electrode disposed on the second dielectric layer;
 a connection electrode penetrating through the first and second internal electrode layers, spaced apart from the at least three first internal electrodes, and connected to the second internal electrode;
 a plurality of first external electrodes disposed at corners of the body to be connected to the at least three first internal electrodes, respectively, through the respective lead portions of the at least three first internal electrodes; and
 a second external electrode disposed to be connected to the connection electrode on the body,
 wherein at least a portion of each of the at least three first internal electrodes overlaps the second internal electrode in the first direction.

15. The multilayer electronic component of claim 14, wherein the at least three first internal electrodes include four internal electrodes spaced apart from each other, extending to four corners of the body, and connected to the plurality of first external electrodes, respectively.

16. The multilayer electronic component of claim 14, wherein an area in which one of the at least three first internal electrodes overlaps the second internal electrode in the first direction is different from an area in which another one of the at least three first internal electrodes overlaps the second internal electrode in the first direction.

17. A multilayer electronic component comprising:
 a first internal electrode layer including a first dielectric layer and at least three first internal electrodes disposed to be spaced apart from each other on the first dielectric layer;
 a second internal electrode layer including a second dielectric layer and a second internal electrode disposed on the second dielectric layer;
 a body including a capacitance forming portion in which the first internal electrode layer and the second internal electrode layer are alternately disposed in a first direction;
 a connection electrode penetrating through the first and second internal electrode layers, spaced apart from the at least three first internal electrodes, and connected to the second internal electrode;
 a plurality of first external electrodes disposed to be connected to the at least three first internal electrodes, respectively, on the body; and
 a second external electrode disposed to be connected to the connection electrode on the body,
 wherein at least a portion of each of the at least three first internal electrodes overlaps the second internal electrode in the first direction such that an area in which one of the at least three first internal electrodes overlaps the second internal electrode in the first direction has a different size from an area in which another one of the at least three first internal electrodes overlaps the second internal electrode in the first direction.

18. The multilayer electronic component of claim 17, wherein the at least three first internal electrodes include four internal electrodes spaced apart from each other, extending to four corners of the body, and connected to the plurality of first external electrodes, respectively.

19. The multilayer electronic component of claim 18, wherein, when areas in which each of the four internal electrodes overlaps the second internal electrode in the first direction are S1 to S4, respectively, S1 to S4 have different values from each other.

20. The multilayer electronic component of claim 17, wherein, among the plurality of first external electrodes, two external electrodes, that are respectively connected to the corresponding first internal electrodes having different overlapping areas with the second internal electrode, have different sizes from each other in a second or third direction, the second and third directions being perpendicular to the first direction.

* * * * *